J. A. MARSH & R. ULRICH.
AXLE CONSTRUCTION FOR AUTOMOBILES.
APPLICATION FILED MAR. 29, 1913.

1,098,816.

Patented June 2, 1914.
4 SHEETS—SHEET 1.

WITNESSES

INVENTORS
J. A. Marsh
Roy Ulrich.
By E. E. Vrooman, Attorney.

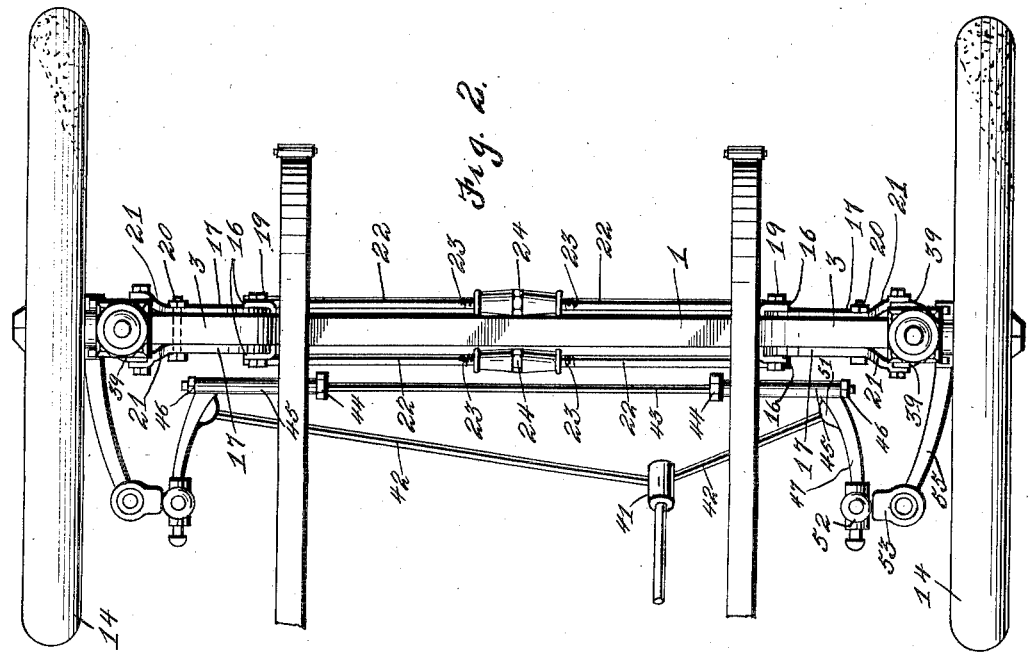
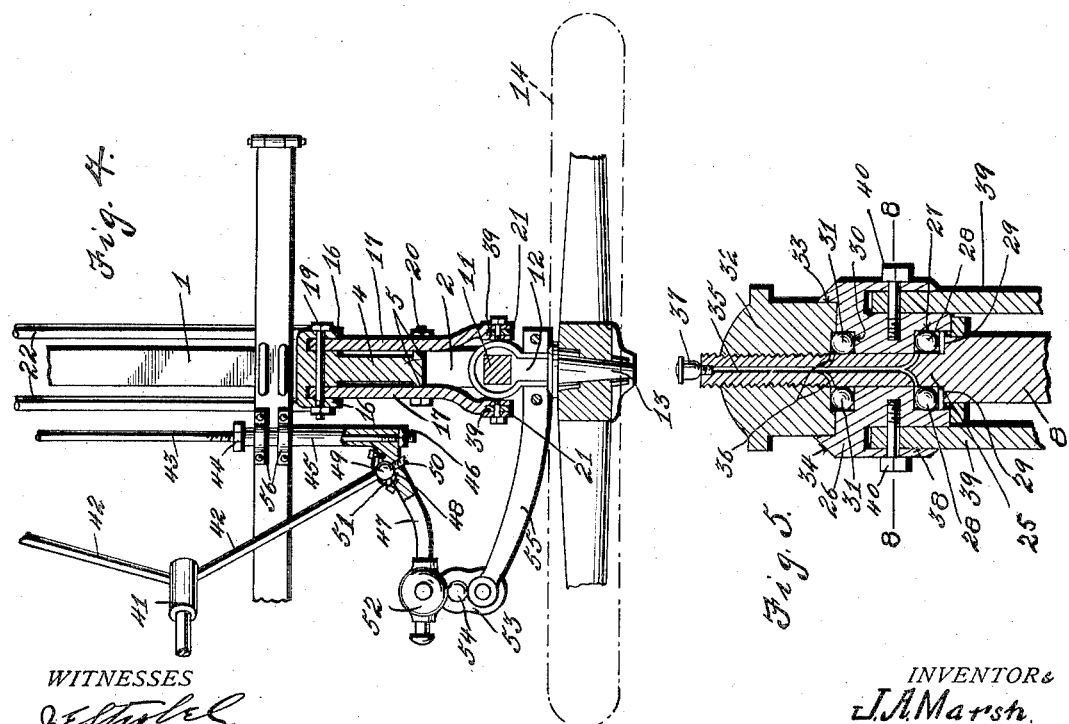

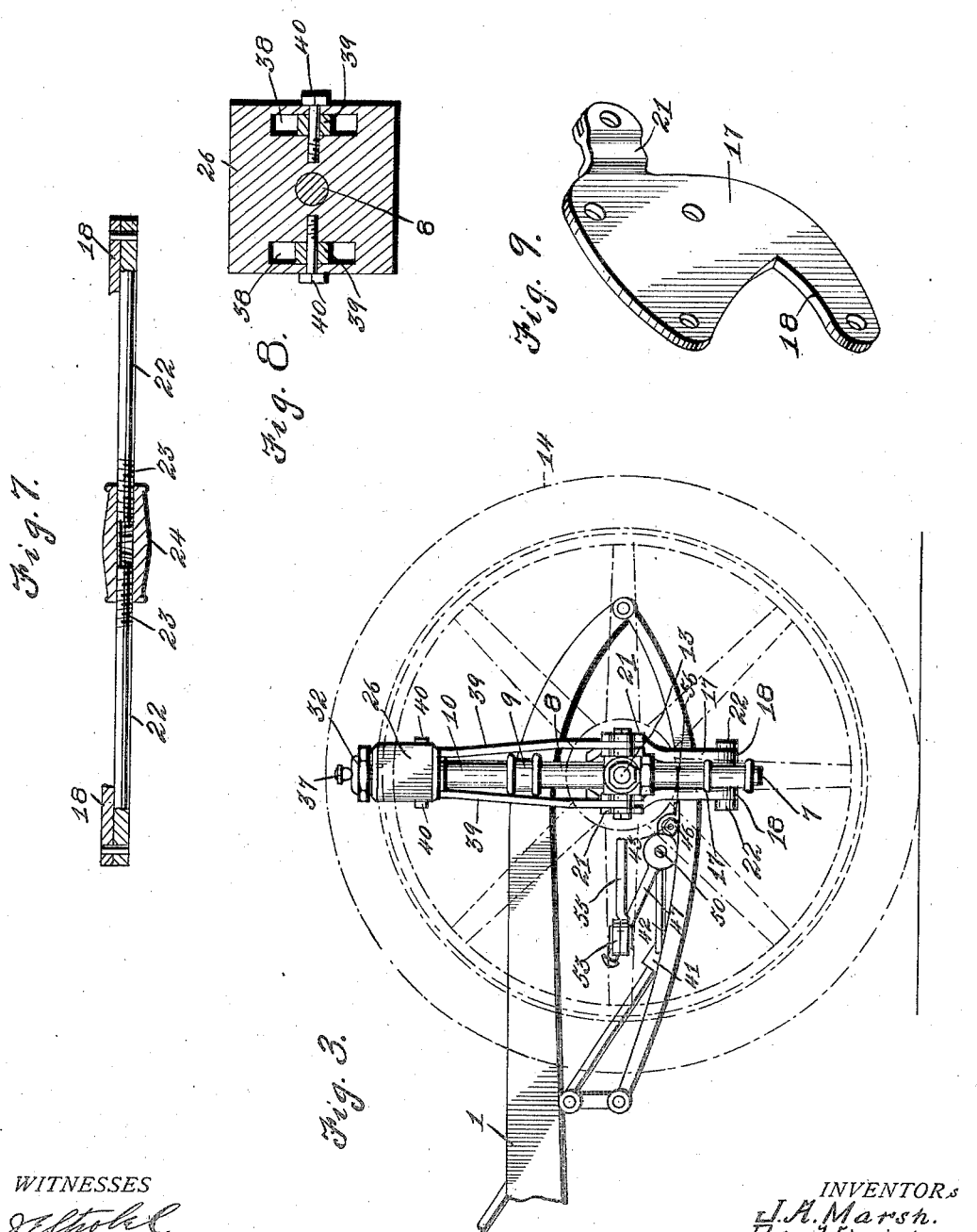

J. A. MARSH & R. ULRICH.
AXLE CONSTRUCTION FOR AUTOMOBILES.
APPLICATION FILED MAR. 29, 1913.
1,098,816.
Patented June 2, 1914.
4 SHEETS—SHEET 4.
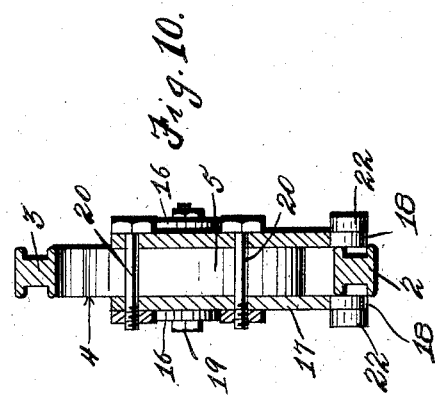
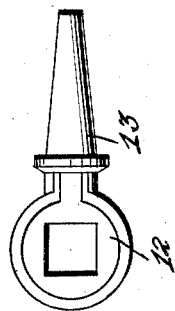
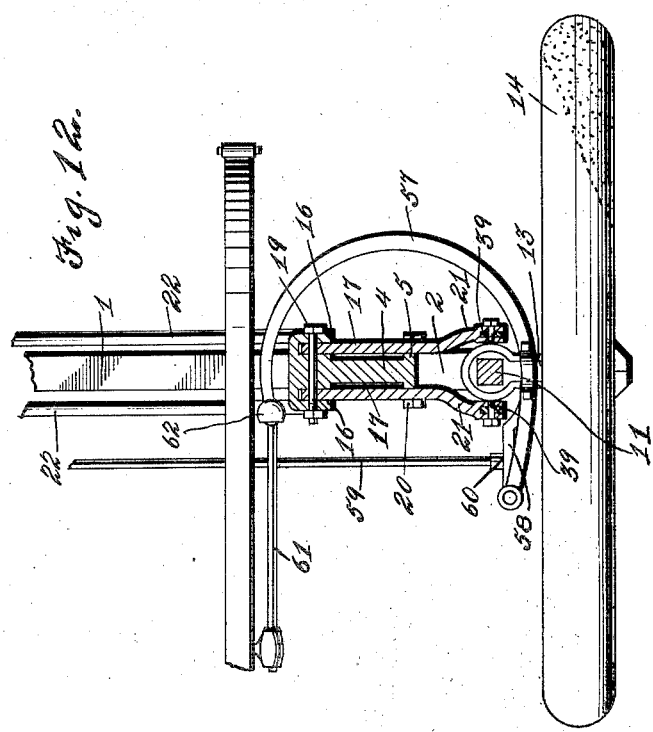
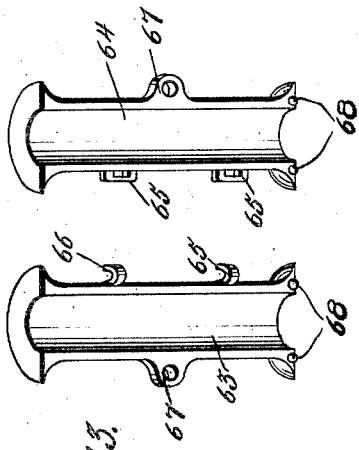
WITNESSES
INVENTORs
J. A. Marsh.
Roy Ulrich.
Attorney,

UNITED STATES PATENT OFFICE.

JOHN A. MARSH AND ROY ULRICH, OF JACKSONVILLE, OREGON.

AXLE CONSTRUCTION FOR AUTOMOBILES.

1,098,816.  Specification of Letters Patent.  Patented June 2, 1914.

Application filed March 29, 1913. Serial No. 757,642.

*To all whom it may concern:*

Be it known that we, JOHN A. MARSH and ROY ULRICH, citizens of the United States, residing at Jacksonville, in the county of Jackson and State of Oregon, have invented certain new and useful Improvements in Axle Construction for Automobiles, of which the following is a specification, reference being had therein to the accompanying drawing.

This invention relates to equalizing devices for automobiles and other vehicles and has for its object the production of a simple and efficient equalizing support for the body of a vehicle whereby the weight of the body may be equally distributed through the several wheels which support the body.

Another object of this invention is the production of a simple and efficient means for attaching the equalizing structure to the body and the axles which support the supporting wheels whereby the weight of the body may be distributed over the several wheels even though one series of wheels should be on a plane lower than the other series of wheels while a car is traveling.

With these and other objects in view, this invention consists of certain novel constructions, combinations and arrangements of parts, as will be hereinafter fully described and claimed.

Figure 1:
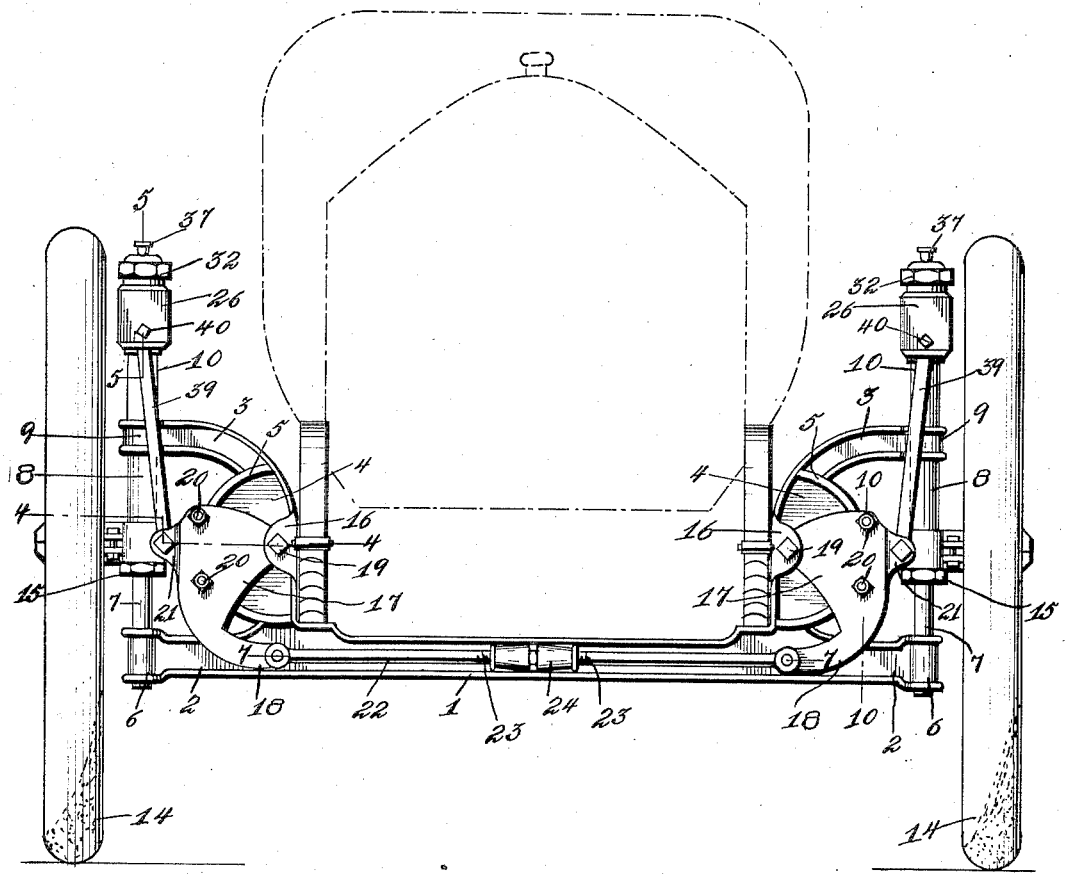
Figure 6:
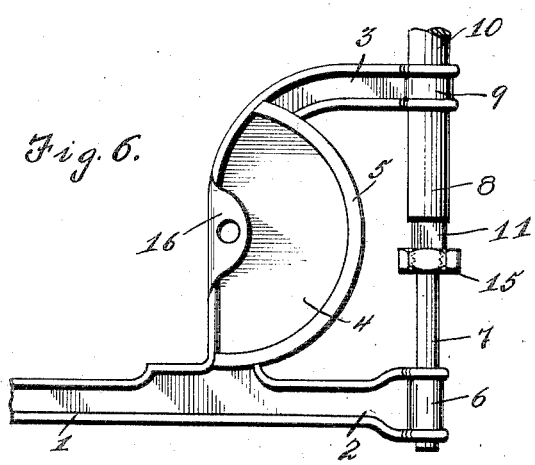

In the drawings:—Figure 1 is a front elevation of the equalizing device showing the same as applied to the front axle. Fig. 2 is a top plan view of the equalizing device illustrated in Fig. 1. Fig. 3 is an end elevation of the equalizing device. Fig. 4 is a section taken on line 4—4 of Fig. 1. Fig. 5 is a section taken on line 5—5 of Fig. 1. Fig. 6 is a front elevation of one end of the axle construction used in connection with the present equalizing device. Fig. 7 is a horizontal sectional view through the connecting turn buckle structure which connects the equalizing plates. Fig. 8 is a section taken on line 8—8 of Fig. 5. Fig. 9 is a detail perspective of one of the equalizing plates. Fig. 10 is a section taken on line 10—10 of Fig. 1. Fig. 11 is a top plan view of the stub axle which supports the wheels. Fig. 12 is a horizontal section through the equalizing device similar to Fig. 4, showing the different steering mechanism attached thereto. Fig. 13 is a detail perspective of the clamping sections which may be employed for supporting the wheels upon the axle provided the supporting rods should become broken or otherwise injured.

By referring to the drawings, it will be seen that 1 designates the main axle construction which comprises an elongated body preferably formed of an I-beam structure for the purpose of lightening the axle and at the same time adding additional strength thereto, and this axle 1 terminates at each end in a substantially U-shaped yoke comprising a lower equalizing rod supporting finger 2 and an upper supporting finger 3. A substantially semicircular spacing member 4 is interposed between the fingers 2 and 3 as clearly illustrated in Fig. 6, and this spacing member 4 is provided upon its outer edge with a rib portion 5 which constitutes a guide for holding the equalizing plates hereinafter described in their spaced relation. The finger 2 is provided with a socket portion 6 in which fits the lower end 7 of the equalizing supporting rod 8. The upper finger 3 is provided with a brass-lined collar 9 in which works the enlarged portion 10 of the vertically extending equalizing rod 8. The rod 8 is provided intermediate its ends with a squared portion 11 over which fits the collar 12 of the stub axle 13 illustrated in Fig. 11. The wheel 14 is supported upon the stub axle 13 in the usual manner. A stop nut 15 is threaded upon the rod 8 intermediate its ends so as to limit the downward movement of the stub axle 13 upon the rod 8.

Each of the yoke portions above mentioned is provided intermediate the fingers 2 and 3 upon each side thereof with a spaced lip 16 and this lip constitutes a retaining lug for the equalizing plates 17. These equalizing plates 17 constitute a substantially V-shaped body having a laterally curved finger 18 at its lower end. One corner of the equalizing plate 17 is secured to one of the retaining lips 16 and is held between this retaining lip and the substantially semi-circular spacing member 4 by means of a bolt 19 thereby constituting a pivot therefor. One equalizing plate 17 is employed upon each side of the spacing member 4 as clearly illustrated in Fig. 4 and the plates are connected by means of the transversely extending bolts 20 illustrated clearly in Fig. 1 so as to constitute a brace for the plates and prevent the same from moving laterally relative to each other. Each of the plates 17 is provided near its outer end with an outwardly bowed projecting lug 21. and these lugs are bowed outwardly so as to be spaced from the supporting standard 8 and have a free movement without rubbing or bearing against this vertically extending rod 8.

As previously explained a pair of equalizing plates 17 is employed in connection with each of the yoke portions formed upon the axle 1 and the downwardly extending arms upon the equalizing plates upon each side of the axle are connected by means of the connecting rods 22 which connecting rods have their adjacent ends threaded as indicated at 23 and connected by means of a turn-buckle 24 whereby the length of the rods 22 may be adjusted.

As illustrated in Figs. 1 and 5, the vertically extending rod 8 is provided at its upper end with a reduced extension 25 and upon this reduced extension 25 is placed a head 26. The head 26 is provided with a socket portion 27 in which are mounted the ball bearings 28 which ball bearings rest upon the shoulder 29 formed adjacent the reduced extension 25. The head 26 is also provided upon its upper edge with a socket portion 30 in which fit the ball bearings 31 and constitute a bearing for the threaded nut 32 placed upon the upper extremity of the reduced portion 25. The retaining nut 32 fits in the socket 33 formed upon the upper edge of the head 26 and it will, therefore, be seen that considerable lateral strain is relieved from the reduced portion 25 by means of the circumferential flange 34 formed around the upper edge of the head 26. The reduced portion 25 of the vertically extending rod 8 is provided with a groove 35 and this groove is provided with a plurality of laterally extending channels 36 which communicate with the respective sockets 27 and 30 for lubricating the ball bearings contained therein. An oil cup 37 is secured to the upper end of the reduced portion 25 to furnish the lubricant for the purpose just named.

The head 26 is provided with a pair of sockets 38 upon the lower edge thereof which sockets receive the upper ends of the vertically extending equalizing links 39. These equalizing links 39 are firmly secured within these sockets 38 by means of bolts 40. As illustrated clearly in the drawings, it will be seen that a rod 39 is placed upon each side of the vertically extending members or rods 8 and the upper ends of these rods converge toward each other so as to fit snugly against the heads 26 and fit in the sockets 38 to counteract the tendency of the wheels to push the upper ends out of engagement with the head, thereby relieving considerable strain from the securing bolts 40.

It will be seen by carefully considering Fig. 5 that if the pressure is brought to bear in the upward position, the pressure will be taken up by the ball bearings 31 contained within the socket 30, whereas if the pressure is brought in a downward position by means of the arms 39, the pressure will be taken up by the ball bearings 28 contained within the socket 27.

From the foregoing description, it will be seen that if the car is traveling and should one side of the machine be on a plane lower than the other side, the yoke members upon one side of the machine 1 will slide upon the rod 8 and thereby cause the link members 39 to be drawn upwardly. At this time the equalizing plates 17 may be swung thereby drawing the downwardly projecting end 18 of said plates toward the side of the machine which is upon the lower plane and pulling upon the rods 22, which will in turn pull upon the equalizing plates 17 upon the opposite side of the machine and pull downwardly upon the links 39 and in turn force a downward pressure upon the heads 26 supported upon the rods 8 upon the opposite side of the machine and thereby distribute considerable of the weight upon the opposite wheels and relieve considerable strain from the wheels upon the lower plane. In this manner the weight of the body will be distributed upon the machine in such a manner as to relieve all of the strain of the weight upon one side of the machine and the wheels upon one side of the body will be allowed to go up and the wheels upon the other side of the body will be allowed to go down without necessarily disturbing the position of the car body.

By carefully considering Fig. 4, it will be seen that the steering device comprises the steering rod 41 which is connected to the steering links 42 which steering links extend upon opposite sides of the machine in the usual manner. A connecting link 43 connects the opposite steering links 42 and this connecting link 43 is provided near each end with a threaded portion adapted to receive a spacing nut 44 which constitutes a stop for the collars 45 adjustably mounted upon the outer ends of the connecting rod 43. The extreme ends of the rod 43 are threaded to receive a nut 46 which constitutes means for holding the collars 45 in a set position upon the rod 43. Each collar 45 is provided with a laterally extending arm 47 and this arm is provided with a socket 48 for receiving the ball bearing head 49 of the steering rods 42. An adjusting screw 50 is carried by the arm 47 so as to adjust the ball 49 upon the end of the rod 42 within the socket adapted to relieve the same and this ball is firmly held upon the arm 47 by means of a clamp 51. A sliding sleeve 52 is mounted upon the outer end of the arm 47 and is connected to a clamping bracket 53 by means of a ball and socket joint 54. This clamp is hingedly connected to the arm 55 which arm is connected in turn to the stub axle 13. It will, therefore, be seen that the device may be easily and quickly attached to the steering gear and yet will perform the desired function of the equalizing device just described in view of the fact that the steering device is so connected as to allow an upward and a downward movement of the stub axle relative to the steering mechanism. The collar 45 upon each end of the rod 43 passes through the brackets 56 which brackets constitute guides therefor. Of course, it should be understood that if it is so desired any suitable device may be employed for connecting the steering gear, as for instance, the substantially semi-circular arm 57 which is connected to the arm 58 carried by the stub axle 13 as illustrated in Fig. 12. The connecting rod 59 is secured to this arm 58 by means of a collar 60 and the semi-circular arm 57 is connected to the steering rod 61 by means of the ball and socket joint 62.

In Fig. 13, we have illustrated a clamp which may be employed in connection with the present invention provided the vertical rod should become broken or injured in the traveling of the machine, and this clamp comprises a primary section 63 and an auxiliary section 64. The auxiliary section 64 is provided with a plurality of loops 65 positioned upon the side of the body and the primary section 63 is provided with a plurality of hooks 66 which are adapted to fit in the loops 65 and constitute a hinge portion. Apertured lugs 67 are positioned upon the opposite sides of the sections 63 and 64 and adapted to receive any suitable fastening means for holding the sections in a substantially assembled position. When it is necessary to use this sectional clamp or jack, the same may be placed around the vertically extending rod 8 and under the upper end of the axle, the lower end of the jack resting upon the top of the spindle or stub axle. A cone bearing 68 may be formed upon the lower edge thereof to constitute an efficient bearing for permitting free action of the wheels.

Having thus described the invention, what is claimed as new, is:—

1. An equalizing device for a vehicle comprising an axle, said axle provided with yokes at each end thereof, vertically extending members carried by said yokes, a stub axle carried by said vertically extending members, and equalizing means carried by said axle and engaging said vertically extending members for distributing the weight upon opposite sides of a machine when the wheels upon one side of a machine are upon a lower plane than the wheels upon the opposite side of a machine.

2. A device of the class described comprising an axle provided with yoke portions constituting spaced fingers, vertically extending members slidably mounted thereon, wheels supported by said vertically extending members, and equalizing means carried by said axle and engaging said vertically extending members for distributing the weight from one end of said axle to the other end of said axle.

3. A device of the class described comprising an axle comprising yoke frames upon each end, each yoke member comprising a pair of spaced fingers, a vertically sliding supporting rod carried by said fingers, a substantially semi-circular spacing member interposed between said fingers, equalizing plates carried by said spacing member and positioned upon each side thereof, and means connecting said equalizing plates for distributing a weight supported thereon upon opposite ends of said axle.

4. A device of the class described comprising an axle provided with yokes at each end thereof, said yokes provided with spaced fingers, vertically extending rods carried by said yokes, said yokes provided with spaced lugs adjacent said spaced fingers, equalizing plates secured to said lugs, means connecting the equalizing plates upon opposite ends of said axle, and means connecting said equalizing plates with the upper ends of said vertically extending rods for distributing the weight upon one end of the axle to the other end of the axle.

5. A device of the class described comprising an axle provided with spaced fingers at each end, a spacing member interposed between said fingers, spaced lugs carried by said spacing member, substantially V-shaped equalizing plates secured to said lugs, connecting means for connecting the equalizing plates upon opposite ends of said axle, vertically extending wheel supporting rods carried by said spaced fingers, and means connecting said equalizing plates to the upper ends of said vertically extending rods.

6. A device of the class described comprising an axle, spaced fingers secured to the opposite ends of said axle, a vertically extending wheel supporting rod carried by said fingers, substantially V-shaped equalizing plates secured to said axles at each end and upon opposite sides thereof, each plate provided with an inwardly downwardly extending finger, an adjusting rod connecting the fingers of said plates upon opposite ends of said axle for causing said plates to swing in unison, each equalizing plate provided with outwardly projecting link engaging ears, bolts passing through said equalizing plates for connecting the plates upon opposite sides of said axle, and links connecting said link engaging ears to the upper ends of said vertically extending rods.

7. A device of the class described comprising an axle, a vertically extending wheel supporting rod carried by said axle, said rod provided with a reduced upper end, a head positioned upon said rod, equalizing plates carried by said axle upon opposite ends thereof, means connecting said equalizing plates, links connecting said head to one of said equalizing plates, said heads provided with socket portions, the upper ends of said links fitting in said socket portions, and means passing through said heads and engaging the upper ends of said links for retaining said links in said socket portions.

8. A device of the class described comprising an axle, equalizing plates carried upon opposite ends of said axle, means connecting said equalizing plates, a vertically extending rod carried by said axle, a head carried by said vertically extending rod, links connecting said equalizing plates to said heads, said heads provided with socket portions, said links fitting in said socket portions, means for holding said links in said socket portions, and means for holding said heads upon said vertically extending rods.

9. A device of the class described comprising an axle, vertically extending wheel supporting rods supported upon opposite ends of said axle, equalizing plates carried by said axle upon opposite ends thereof, means connecting said equalizing plates, each vertically extending rod provided with a reduced upper end, a head carried upon each vertically extending rod, bearings carried within said heads, means connecting said heads with said equalizing plates, and a cap threaded upon the upper end of said reduced ends for holding said heads upon said vertically extending rods.

10. A device of the class described comprising an axle, a vertically extending wheel supporting rod carried at each end of said axle, equalizing plates carried upon opposite ends of said axle, means for connecting said equalizing plates together, means for connecting said equalizing plates with said vertically extending rods, each vertically extending rod provided with a squared axle, a stub axle supported upon said squared axle, and means carried by said vertically extending rod for holding said stub axle in a set position upon said vertically extending rod.

In testimony whereof we hereunto affix our signatures in presence of two witnesses.

JOHN A. MARSH.
ROY ULRICH.

Witnesses:
LESLIE W. STANSELL,
D. W. BAGSHAW.